Figure 1:
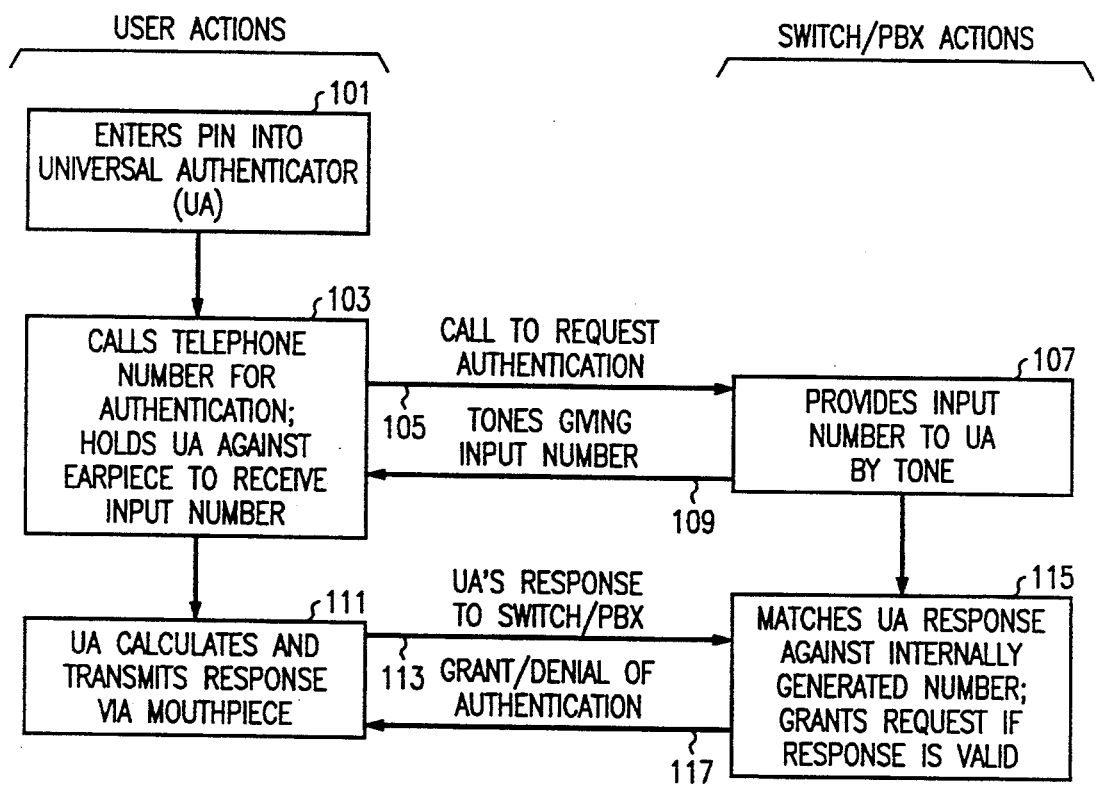

United States Patent [19]
Akhteruzzaman et al.

[11] Patent Number: 5,406,619
[45] Date of Patent: Apr. 11, 1995

[54] UNIVERSAL AUTHENTICATION DEVICE FOR USE OVER TELEPHONE LINES

[75] Inventors: Akhteruzzaman, Naperville, Ill.; Amitava Hazra, Holmdel, N.J.

[73] Assignee: AT&T Corp., Murray Hill, N.J.

[21] Appl. No.: 221,273

[22] Filed: Mar. 31, 1994

Related U.S. Application Data

[63] Continuation of Ser. No. 863,901, Apr. 6, 1992, abandoned.

[51] Int. Cl.⁶ .......................................... H04M 11/00
[52] U.S. Cl. ..................................... 379/95; 380/23; 380/28; 235/380; 235/382; 340/825.34; 379/91; 379/144
[58] Field of Search .................... 340/825.34, 825.31, 340/825.32, 825.33; 379/355, 356, 357, 91, 90, 95, 96, 144; 235/379, 380, 382; 380/23, 25, 28

[56] References Cited

U.S. PATENT DOCUMENTS

| | | | |
|---|---|---|---|
| 4,126,768 | 11/1978 | Grenzow | 179/90 B |
| 4,471,165 | 9/1984 | DeFino | 379/96 |
| 4,630,201 | 10/1986 | White | 364/408 |
| 4,747,050 | 5/1988 | Brachtl et al. | 235/382 |
| 4,755,940 | 7/1988 | Brachtl et al. | 235/382 |
| 4,933,269 | 6/1990 | Marshall et al. | 340/825.34 |
| 4,935,462 | 6/1990 | Austin | 340/825.34 |
| 4,995,077 | 2/1991 | Malinowski | 379/355 |
| 4,998,279 | 3/1991 | Weiss | 380/23 |
| 5,023,908 | 6/1991 | Weiss | 380/23 |
| 5,050,207 | 9/1991 | Hitchcock | 379/96 |
| 5,060,263 | 10/1991 | Bosen et al. | 380/25 |
| 5,168,250 | 12/1992 | Weiss | 380/23 |

FOREIGN PATENT DOCUMENTS

| | | | |
|---|---|---|---|
| 0427465 | 11/1990 | European Pat. Off. | G07F 7/10 |
| 2655797 | 6/1991 | France | H04M 1/68 |

OTHER PUBLICATIONS

GSM (European Global Systems for Mobile Communications) 02.09—version 3.0.0—"Security Aspects", Feb. 15, 1988.

GSM (European Global Systems for Mobile Communications) 03.02—version 3.3.0—"Security Related Network Functions", Feb. 21, 1990.

*Primary Examiner*—Curtis Kuntz
*Assistant Examiner*—Stella L. Woo
*Attorney, Agent, or Firm*—Werner Ulrich

[57] ABSTRACT

This invention relates to a universal authenticator for use with an ordinary telephone station over an ordinary telephone line. The authenticator, which is the size and shape of a credit card, receives a query number by being held against the receiver of the telephone station and receiving audio signals in a receiver. Using its own key, it transforms the received query number into an individualized response number which it transmits via its speaker when the authenticator is held against the microphone of the telephone station.

10 Claims, 5 Drawing Sheets

AUTHENTICATION SCENARIO

AUTHENTICATION SCENARIO

STATE DIAGRAM OF THE UA

UNIVERSAL AUTHENTICATOR

UNIVERSAL AUTHENTICATION DEVICE FOR USE OVER TELEPHONE LINES

This application is a continuation of application Ser. No. 07/863,901, filed on Apr. 6, 1992, now abandoned.

TECHNICAL FIELD

This invention relates to authentication arrangements for telecommunications systems users.

PROBLEM

Telephone calling card fraud and fraudulent use of corporate PBXs currently costs consumers over a billion dollars a year. In a typical arrangement, callers to the PBX use an 800 number to get access to the PBX. Their authenticity is verified by asking them to dial a multi-digit digit access code, which, if authentic, gives these people access via the PBX to a second dial tone. The caller can then place any outgoing call not denied to normal users within the PBX. Clearly, anyone who can obtain the 800 number and the access code can then place calls that are charged to the PBX. More generally, the present calling card arrangements are also subject to extensive fraud through the use of stolen cards or through the interception by audio taps or visual observation of a calling card number.

Computer "hackers" are particularly active in using their computers to access corporate PBXes and determine valid access codes by trial and error. They then sell these codes along with the PBX telephone numbers to "resellers" who resell these to numerous fraudulent users. This vastly magnifies the scope of the fraud. More generally, a problem exists that there is no inexpensive, convenient arrangement for permitting users of ordinary telephone lines to have their identity authenticated so that they will not be falsely billed for telephone or other services.

SOLUTION

The above problem is solved and an advance is made over the prior art by using a universal authentication (UA) device in accordance with the principles of the invention, that can be used over any phone line to authenticate the use of calling cards, private corporate PBXs etc; the authentication device provides unique signals that authenticate its user. The authentication device is used in lieu of a calling card and is equipped with hardware to allow a query-response type of authentication scheme to be used or to provide the data of a query and the response to that data. In any case, the authentication message (response) sent by the device will be different for successive authentication requests. It includes an audio interface (tone generation and reception) which allows the device to communicate directly with the telephone using tone signals and frees the user from manual keying in of codes.

Advantageously, the UA does not require a special telephone station (such as mobile phone, smart card station etc.). The device can also be used for authentication of uses of various other services (banking etc.) over telephone lines, as well as to help authenticate remote logins to computer systems. The added cost of providing such a device is quite small (a one-time cost of a few dollars per authorized user). As far as the user is concerned, using this device is no more complicated than using an Automatic Teller Machine.

DESCRIPTION

The card-sized device is equipped with computational hardware to implement a function mapping queries into responses, a keypad to enter input, an LCD display and an audio interface which can receive input and provide output in the form of tones transmittable via a telephone handset over a customer line to a switching system. The object of implementing a function mapping queries (a first number) into responses (part of a second number) is to create time varying responses, based on time varying queries, so that an interception of one query-response couple will not be useful at a later time. It also has the magnetic bar information currently on calling cards so that it can also be used at the special stations already provided for calling cards as well as from any other phone. Two different devices provided to two different users picked at random, will almost certainly use different functions to generate responses. It should be noted that the device is significantly different from the AT&T SMART CARD ® and other smart cards which can only be used from special stations. (This is discussed in detail later). Time varying authentication messages may be produced by three different methods. The first method is to use a challenge-response scheme—that is, to let the system at the far end provide a random number to the authentication device, which then computes an appropriate response and transmits it back to the system. The other method is to use the Time of Day as input to a function, and transmit the output of the function as well as the Time of Day used, to the system at the far end. The third method is to use a monotonically increasing or decreasing function, such as a count which is incremented with each use. The first method is described in detail in the following paragraphs. The second and third methods are briefly described later.

USING THE DEVICE

A procedure for using this device for corporate PBX authentication is as follows. Each legitimate user is assigned a Personal Identification Number (PIN) which is also associated with the particular device provided to him or her. Before seeking authentication the user enters his/her PIN into the device which we call the Universal Authenticator (UA). If the PIN is correct, the UA is activated and can be used. Next, the user dials a phone number (printed on the UA if desirable) to seek authentication (as done currently with corporate PBXs). A voiced response directs the user to place the activated UA close to the earpiece of the calling telephone station and enable it to receive incoming tones from the earpiece. The authentication system then sends a set of tones representing a random number which is received by the audio interface of the UA. This is the query number. The UA then produces an output number as an appropriate response to the query number and flashes a message to the user to place the UA on the mouthpiece and hit the key to start transmission. The UA sends the set of tones representing the output that it has produced. The system matches the response against an output that it generates internally, and authenticates the request if there is a match. The overall scenario of operation is shown in FIG. 1.

The user has the option, the only option available in some presently available authentication devices, of manually keying in the number to the UA and dialing the response back to the system manually. In this case a voiced response from the system provides the user with a random number to enter into the UA. Once this is keyed into the UA by the user, the UA produces a corresponding output number on its display. This is entered by the user (using a telephone dual tone multi-frequency (DTMF) keyboard if provided or using voice if a speech-recognizing system is supported) to seek authentication. Alternatively, and preferably, the user may request the UA to transmit the tones representing the output number.

Figure 2:
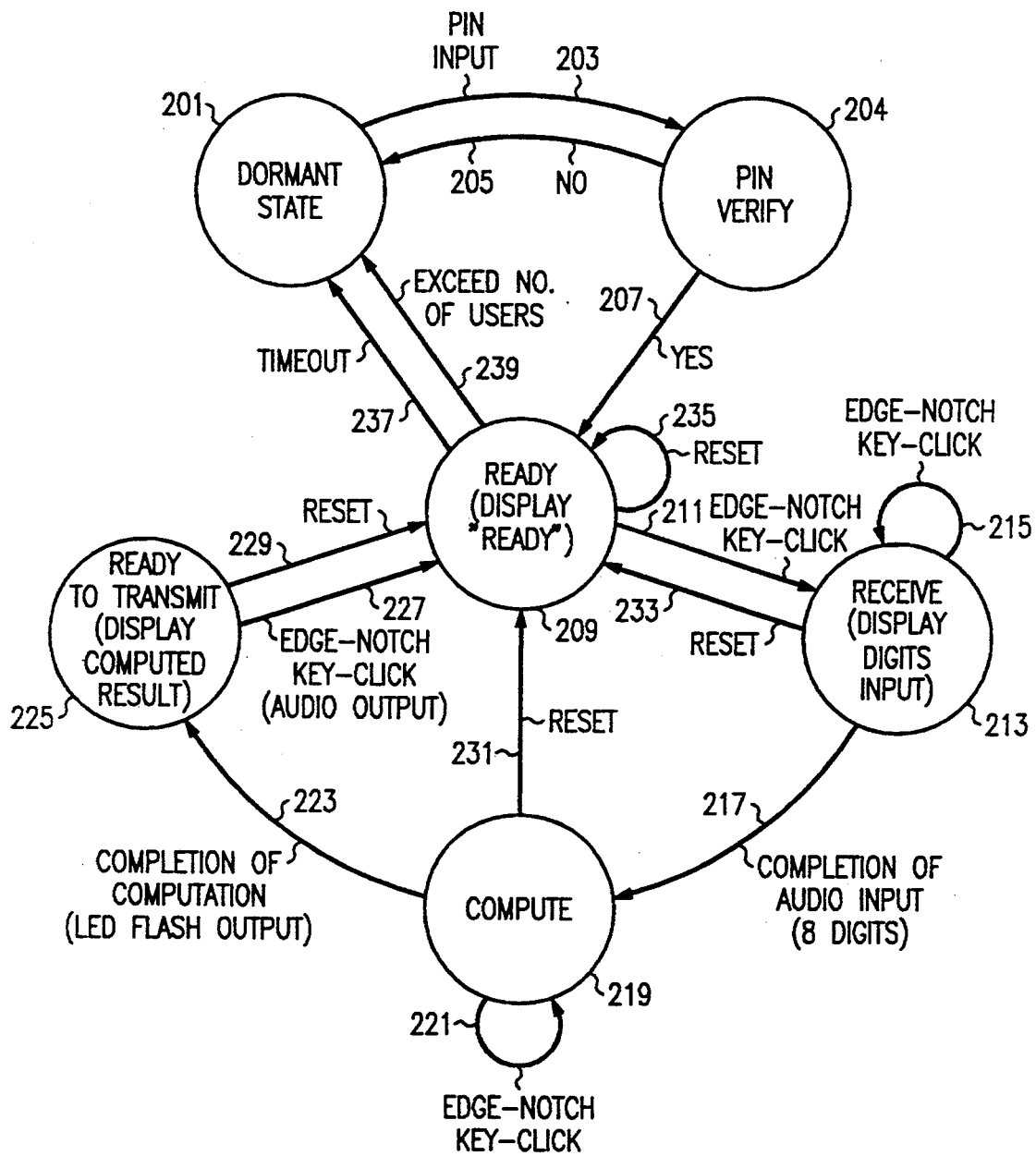

A high level state diagram of the device is shown in FIG. 2. Initially, following the entry of the PIN, the device is in the Ready state. While in the Ready state, clicking a special receive/transmit key (in an edge notch—shown in FIG. 3) puts the device in the Receive state. In the Receive state the device can receive either audio or keyed input. On completion of reception of an input of 8 digits, the device goes to the Compute state where the response is computed. On completion of computation, the device enters the Ready to Transmit state and flashes a light emitting diode (LED) to indicate completion of computation. While in the Ready to Transmit state, another click of the receive/transmit key transmits the audio output corresponding to the computed response and the device returns to the Ready state. The device may also be reset to the Ready state from any other state by using a reset bar (shown in FIG. 3).

APPEARANCE AND INTERNALS

Figure 3:
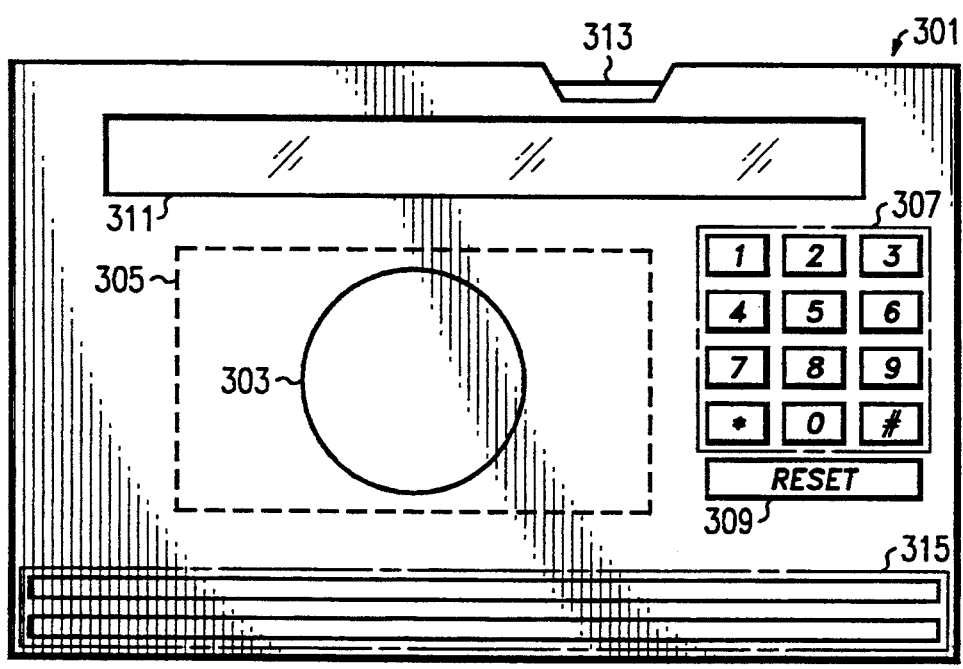

FIG. 3 shows the external appearance of the UA. The external appearance of the device is similar to a smart card except that it has an audio interface to allow it to communicate using an ordinary telephone station. The keypad allows entry of the PIN or manual entry of the input random number (if the user so chooses). The LCD displays the number entered. After computation of the response, the response number is also displayed. The LED flashes to indicate that computation is complete. The key in the notch on the edge is for enabling the audio reception/transmission and is convenient when the user has to hold the UA flat against the earpiece or mouthpiece.

A magnetic bar code on the device allows it to be used from a calling card reader station as well. In this case, only the encoded identification is transmitted, so that authentication is much less secure.

Figure 4:
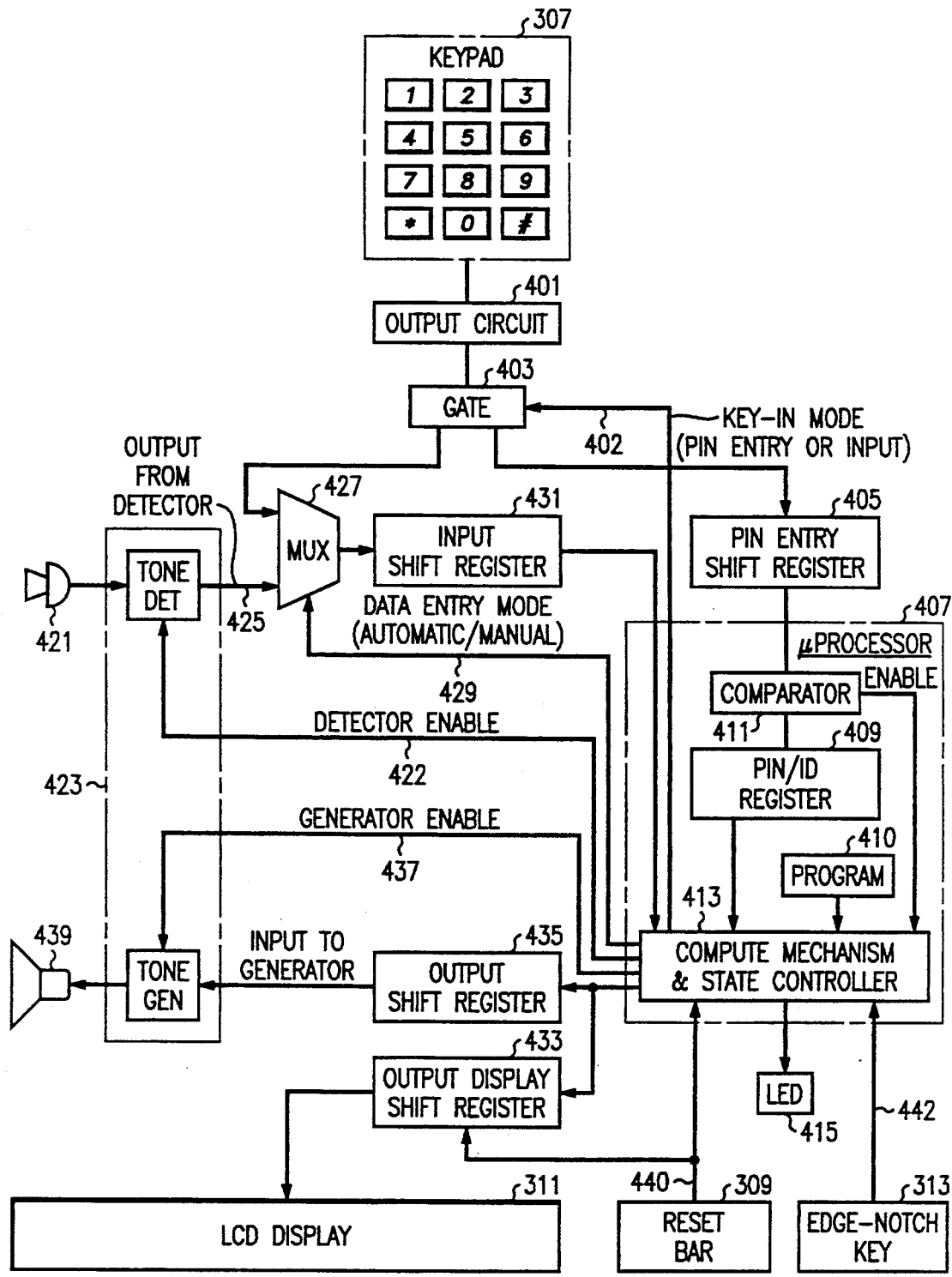

The internals of the device are shown in FIG. 4. Entry from the keypad is done either when entering the PIN or if manual mode of entering the input number is chosen. Depending on the operation, the entry from the keypad is gated to either a PIN entry register or a MUX. The content of the PIN entry register is compared with the content of a stored PIN register and in case of a match, the compute/table lookup unit of the microprocessor (for generating the response) is enabled for subsequent operation. When the user enables the tone detection (by using the key in the notch) the received tones (from the receiver) are converted into bits which are sent to the MUX. The MUX allows the choice of automatic mode (through the audio interface) or manual mode (through the keypad) of input entry. The entry selected by the MUX is entered into the input shift register and subsequently provided to the compute/table lookup unit. On completion of response computation, the response is provided to both the output display register and the output shift register. The output display register allows the response output to be displayed in the LCD. The content of the output shift register is provided to the tone generator when the user enables it (by clicking the key in the edge notch a second time) and the tone generator converts the output to tones which are transmitted by the transmitter.

FIG. 1 is a block diagram of the scenario for authentication. The user enters a PIN into a universal authenticator (action block 101 ). This primes the universal authenticator for later use. The user then calls a telephone number for the authentication service and holds the UA against the earpiece of the telephone instrument to receive an input number, generally a random number generated by the authentication system. The call is set up (arrow 105) to the authentication system and the authentication system which is generally either a switching system (switch) or a PBX provides a random number to the UA by means of tone signals. These tone signals are transmitted to the UA (arrow 109) and are received via the earpiece of the handset of the telephone instrument. The UA then calculates the response and transmits a response via the mouthpiece of the subscriber handset. This response is transmitted to the authentication system (arrow 113) which matches the UA response against an internally generated number and grants the request if the response is valid (action block 115). The authentication system then transmits back to the user a grant or denial of the authentication (arrow 117) after which the user can make a telephone call or otherwise take advantage of the positive authentication. With the universal authenticator described herein, it is also possible to use keyboard entry into the UA instead of listening to tones and to inform the user of the random number through a voiced response from the authentication system. Similarly, it is also possible for the user to transmit a response to the authentication system by keying in the response using a dual tone multifrequency (DTMF) keypad of the user's telephone instrument. Further, in an alternative configuration, the UA itself supplies the input number. With this configuration, block 107 and arrow 109 are not used and the UA instead of receiving the input number generates the input number internally within block 103. The response in this case must include the input number to permit the authentication system to authenticate the "response" number from the same input number that was used by the UA.

FIG. 2 is a state diagram of the UA. In the dormant state 201, the user may supply a PIN input 203. This places the UA in state 204 wherein it verifies whether the PIN input is correct. If not, the UA returns (arrow 205) to the dormant state. If the PIN is correct (arrow 207), the UA goes to the ready state (209) and the displays a ready signal. The user then makes the call to request authentication and places the UA next to the earpiece of the telephone instrument handset and clicks the edge notch key of the UA (arrow 211). This places the UA in the receive state (213) ready to display input number digits as they are received. The UA remains in the receive state until all input digits have been received so that a false edge notch key click while the UA is in the receive state (arrow 215) is simply ignored. When the input digits have been received (arrow 217), the UA goes into the compute state (219) in order to compute the response number. Again, a premature edge notch key click (arrow 221 ) while the UA is in the compute state will have no effect. After the UA has completed computing the response (arrow 223) (this is signaled to the user by having the LED display flash) the UA goes into the ready to transmit state (225). The user then places the UA next to the mouthpiece of the telephone handset and presses the edge notch key click (arrow 227) in order to cause the response output to be transmitted over the telephone connection to the authentication system. This returns the UA to the ready state (209) If for any reason a user wishes to return to the ready state at any time and start over, this can be accomplished by operating the reset key which will cause the UA to return to the ready state (arrows 229, 231, 233, and 235). The UA returns to the dormant state from the ready state via either a timeout (arrow 237) or after a predetermined number of uses of the UA (arrow 239) whichever comes first.

FIG. 3 is a physical diagram of the universal authenticator 301. It includes an audio interface 303 comprising a microphone for receiving signals from a telephone connection and a speaker for transmitting signals to a telephone connection. The computing hardware 305 inside the UA is shown by a dashed line since it cannot be seen from the outside of the UA. The UA also has a keyboard 307 which has the 12 DTMF keys and a reset bar 309 for resetting the UA. Also shown are an LCD display 311 of numbers received or generated by the UA and a key 313 in a notch on the edge of the UA. A magnetic code bar 315 is also attached to the outside of the UA so that the UA can be read by conventional credit readers.

FIG. 4 is a block diagram of the internals of the UA. Block 401 represents output circuits connected to the keypad of the UA and generate digital signals corresponding to the numbers of the keypad. Gate 403 controlled by mode signal 402 in this case gates the output from the keypad 307 digital signals to shift register 405. The output of this register is compared in microprocessor 407 which has been broken down conceptually into a program memory 410, a compute mechanism and state controller 413, a stored PIN register 409 which is a small amount of read-only memory preset at the time the UA is given to its user, a comparator 411 for comparing the output of shift register 405, and PIN register 409. Register 409 also stores the sequence identifier of the UA and the private key of the UA. The output of comparator 411 is used by compute mechanism and state controller 413 to determine whether to place the UA into the ready state. LED 415 connected to controller 413 gives an indication to the user. The user is then able, after dialing a connection to an authentication center, to enable the detector by placing enable the tone detector/tone generator 423 to detect incoming signals (detector enable 422) from microphone 421. The detector enable signal 422 comes from the state controller 413 which receives input signals 442 from the edge notch key 313. The output of the tone detector is then fed via multiplexer 427 into shift register 431 whose output goes to the compute mechanism and state controller 413 of microprocessor 407, which is controlled by a stored program 410. Compute mechanism 413 then generates the output, using the input random number, the private key, and the sequence identifier. It transmits the output, which includes the sequence identifier of the UA plus the output corresponding to the input received from shift register 431, to output display register 433 which drives LCD display 311 and also to output shift register 435 which is an input to the tone generator portion of tone detector/tone generator 423. The tone generator is enabled by a signal 437 from state controller and generates tones based on the output of shift register 435 which tones are delivered to speaker 439 for transmission to the authentication system. The reset bar 309 sends reset signals 440 to compute mechanism and state controller 413, and to output display and shift register 433.

Figure 5:
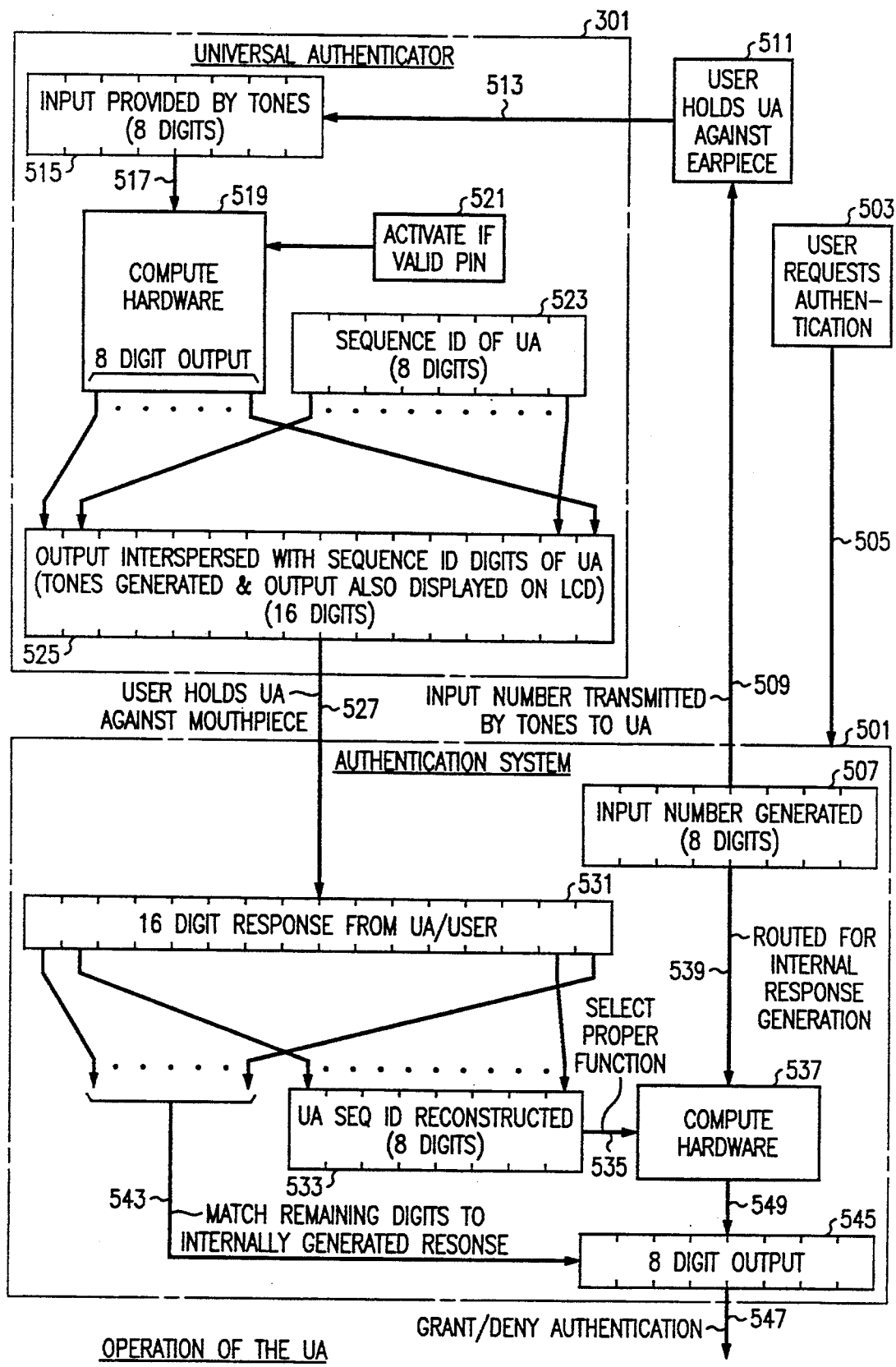

FIG. 5 is an overall block diagram of the operation of the universal authenticator. The circled numbers represent successive steps and have been placed on the diagram to help the reader follow the progress of the process. The two main blocks in dashed lines are the universal authenticator 301 and the authentication system 501 which is likely to be a switching system or a PBX. The process starts when the user requests an authentication (action block 503) (It is assumed that the UA is already in the ready state because the user has previously entered a correct PIN.) The request for authentication is performed by dialing a number for a connection to authentication system 501. The completion of the action is represented by arrow 505. The authentication system generates an 8-digit input number (block 507) which number is then transmitted by tones to the UA (arrow 509). The UA receives these tones by being held against the earpiece of the handset from which the user requested the authentication (action block 511 ). The input number is then transmitted from the tone detector of the UA and is transmitted (arrow 513) to storage 515 for storing the digits representing the input number. (In an alternative arrangement, the input number can be keyed in by the user using keypad 307.) These 8 digits are then passed (arrow 517) to the compute hardware 519 which generates 8 digits of output. These 8 digits of output are combined with an 8-digit identification of the UA (in block 523) to form a 16-digit output consisting of the 8-digit output of the compute hardware and the 8-digit output of the sequence identification. These are stored in the 16 digits of block 525 and are transmitted (arrow 527) from the tone generator 423 via the speaker 439 over the telephone connection to the authentication system 501. They are received and stored in a 16-digit response register 531 which takes the 8-digit UA sequence identifier selected in block 533 and transmits (arrow 535) these digits to the compute hardware. The compute hardware then uses the input number and the UA sequence identifier to compute the 8 digits of output computed by compute hardware 519 of the UA. The computed output is transmitted (arrow 549) to an output register 545 where they are compared (arrow 543) with the 8 output digits received and stored in block 531. If there is a match then authentication is granted and if there is a mismatch authentication is denied. The grant/deny authentication signal 547 is transmitted back to the user and is used to allow the switching system or PBX to accept or reject further calls from that user.

TABLE 1

Table 1 is a list of parts for the various elements of the UA.

| Item | Quantity | Part No. |
| --- | --- | --- |
| Tone Detector/generator | 1 | SSI20C90 |
| Microprocessor | 1 | MC6805 |
| Serial in Parallel out Shift Reg. (for PIN entry Register & Output Shift Reg.) | 2 | 74ALS164 |
| Parallel in Serial out Shift Reg. (for Input Shift Reg.) | 1 | 74ALS165 |
| Model Dimensions | 1 | length 3 3/8", width 2 1/8" |

TABLE 1-continued

Table 1 is a list of parts for the various elements of the UA.

| Item | Quantity | Part No. |
|---|---|---|
| | | (8.57 × 5.40 cm) |

SAFEGUARDS

It is well-known that the query-response method of authentication is superior to a single password or code. (See, for example, W. J. Caelli (ed.): *Computer Security In The Age Of Information*, pages 223–234, Elsevier Science Publishers, B.V., IFIP, 1989.) In the query-response mode the response (the output number) that is provided by the user is good only for the specific query (input number) presented by the system. An eavesdropper can gain nothing by illegal monitoring of the response because the query presented by the system will almost certainly be something different the next time and will require a completely different response. Typically, a complex function (or a large table, or a combination of function and table) to map queries to responses provides good protection against attempts to breach the security of the system.

The second safeguard is the use of the PIN (possibly 4 digits). This ensures that unless the PIN is known the UA is useless to a thief. Also, the user may preload the PIN in a secluded place (away from public phone booth for example). Finally, once the PIN is entered, the UA can only be used for a limited number of times (say 5) and for a limited amount of time. The PIN must be reentered after that to continue using the UA. This ensures that even if a UA loaded with the valid PIN is stolen, it can be used only a limited number of times. Also, if a user loads a PIN and forgets to use the UA subsequently, an automatic internal timer will erase the PIN after some time, making the UA useless for a thief. Of course, the user is expected to report loss of the UA immediately as with other credit cards, calling cards etc.

Finally, as with most authentication schemes, the authentication system will break the connection after a limited number of retries in case of errors. Thus if the system at the far end receives an incorrect response it will send a different input to allow the user to retry. After a limited number of retries the connection is broken. Reestablishing the connection will of course be delayed by the normal delay in the phone network.

IMPLEMENTATION

The implementation consists of two parts; the implementation of the query-response in software/hardware on the switch/PBX, and the implementation of the program on the UA to determine the output number given an input number. The part to be implemented on the switch, PBX or other telecommunications network element, consists of selection of the input random number, a DTMF output and/or voiced response system to relay the number to the user, reception of the response or digits keyed in by user, and matching of these against the system's own internally generated response. The generation of response can be packaged in a chip to avoid any probing. Within the UA there has to be a similar mechanism for generation of response. This mechanism can be an implementation of a computational algorithm or a table lookup process or a combination of both.

The mechanism within the switch/PBX for generation of the matching response must also take into account the identity of the particular UA involved. Two different UAs will almost certainly use different functions for the query-response match. The UA reveals its identity by embedding digits specifying its id number within its output response. The switch/PBX will, with the help of this id, determine the appropriate function to use for checking the response given by the UA.

As indicated earlier the functions mapping queries to responses should be different for different UAs. This may be achieved easily within the UA by having a table mapping certain inputs to certain outputs. But, this has two serious drawbacks—first the set of inputs is limited thus somewhat compromising security, and secondly at the system end a very large amount of memory will be taken up storing the tables of the many UAs. A solution (from standard encipherment algorithms) is to use a common algorithm for the mapping, but modify the algorithm somewhat for each user by using a different key input for each user. Within the system the sequence id of the UA may be used as an entry into a table to find the key for that UA which can then be provided to the algorithm so that it is suitably modified for the particular UA and can calculate the proper response for the given input. Within the UA the details can be somewhat simpler. Only a specific version of the algorithm has to be implemented. This may be wholly or partially table-driven. FIG. 5 shows some details of the overall scheme involving the UA and of the query-response system on the switch or PBX (assuming the sizes of the initial query number and the UA sequence id to be both 8 digits long). (8 digits each for the query number and the sequence id will provide sufficient protection, and at the same time the total response size to be keyed in by user would be 16 digits. This is comparable to calling card codes currently being used (14 digits).

COMPARISON WITH OTHER DEVICES AND SCHEMES

Query-response methods are sometimes used in high security computer systems where the user is supposed to remember the function used. These are usually fairly simple functions. On the other hand, possibly the most secure functions extensively investigated for use in authentication methods such as public-key cryptography and digital signatures are the so-called trap door functions. (Rivest, R. L., Shamir A., and Adelman, L. A Method for Obtaining Digital Signatures and Public-key Cryptosystems. Comm. ACM 21, 2 (February 1978) pp. 120–126.) (Merkle, R. C., and Hellman, M. E. Hiding Information and Receipts in Trap Door Knapsacks. IEEE Transactions on Information Theory, 24, 5 (September 1978) pp 525–530.) (Diffie, W., and Hellman, M. E. Privacy and Authentication-An Introduction to Cryptography. Proc. of the IEEE, 67, 3, (March 1979) pp 397–427.) (di Porto, A. A Public-key Cryptosystem based on a Generalization of the Knapsack Problem. EUROCRYPT 85 Abstracts, Linz, Austria, April 1985.) These of course are useful when part of the key must be made public. However in the arrangement discussed here, since the keys (functions used) for each user can be kept private, and so a private key scheme is sufficient; public key cryptography or digital signature schemes are not needed. Two well-publicized private-key schemes are National Bureau of Standard's Data Encryption Standard (DES) algorithm, (National Bureau of Standards. Report of the Workshop on Cryptography in support of Computer Security, 21-22 September 1976, NBSIR77-1291 (September 1977).) and the Fast Data Encipherment Algorithm (FEAL). (Shimuzu, A., and Miyaguchi, S. Fast Data Encryption Algorithm—FEAL. Abstracts of EUROCRYPT 87, Amsterdam, (April 1987), pp VII-11.) But, calling card fraud prevention does not need ultra-secure functions that were developed in the context of cryptography but merely needs functions complex enough to thwart the run-of-the-mill criminal. Either the DES algorithm or a simpler algorithm based on the DES algorithm may be used here.

Authentication as well as encryption schemes also find use in cellular phone systems. These are used to identify the users uniquely, to keep the communication secure, and to meet other special security-related needs of mobile radio communication. With this in mind, some cellular phone system standards (ETSI/TC GSM Standards, section GSM 3.20, (released by ETSI/PT 12) (February 1990) pp 4-28.) mandate the use of complex encryption/authentication schemes in communication. Appropriately equipped cellular phone stations adapted for digital transmission are needed for such schemes to work. On the other hand the need addressed here is that of authentication only, from a regular phone, and this need can be met using a simple private key scheme. The device (UA) proposed here to perform the authentication, can be used over any phone line, requires no special station, can be implemented in a relatively inexpensive and convenient to operate package, and is unique in these respects.

The UA being proposed also differs from the various kinds of smart cards already available. Smart cards are typically used in financial service transactions but can also be used in a number of areas. (Chaum, D., Schaumuller-Bichl, I. (Ed.) SMART CARD 2000: The Future of IC Cards. North-Holland, 1989.) (McCrindle, J. Smart Cards, IFS Ltd. (Springer-Verlag) 1990.) (Bright, R. SMART CARDS: Principles, Practice, Applications. Ellis Horwood Ltd. (John Wiley distrib.) 1988.) Smart cards are usually equipped with a microprocessor and an adequate amount of memory and can do a host of tasks such as authentication and recording of transactions as well as recall of past transactions etc. However, smart cards (whether of the contact variety or contactless variety) require a special reader station for power and communication with the remote system (banking etc.). Even the so-called "active cards" which have sealed-in batteries require a reader station or at least a data interface in order to communicate directly with a remote system. The UA on the other hand can operate over any ordinary voice phone primarily because of the embedded tone detector and tone generator equipment.

The UA is a sealed unit which will minimize damage due to moisture etc. The batteries are sealed in. A low power indicator informs the user that the battery is about to die; the user then has the option of calling in for a replacement UA. Typically, the UA will be replaced every couple of years just like credit cards, calling cards etc. The battery power is adequate to last the anticipated life-time of the UA. A customer provided PIN will be "burnt" into a ROM in the UA before it is provided to the customer. The UA identity and key or other information necessary to control the generation of the response message are also "burnt" into the ROM of the UA. In one preferred implementation, the program is also "burnt" into the ROM, although, alternatively, it could be loaded into RAM after the battery is installed.

An added benefit of the Universal Authenticator device is that it can replace multiple service cards, calling cards etc. carded by the typical user. It can be used for authentication for many kinds of services. For example, it can be used to improve security of computer systems where remote logins are permitted. Legitimate users can be equipped with an authentication device for the purpose rather than being provided with passwords that have to be changed from time to time. The UA makes it easy to implement secure query response mechanisms using complex functions. On being dialed the system sends a query to which the user must send an appropriate response in order to be logged in. This would be a relatively inexpensive and convenient method to significantly improve the login security of such systems. It requires no special equipment at the users end.

Different codes for different services can be used to set the UA to a specific mode of operation for authenticating the use of the desired service. The telephone number to request the authentication for using the specific service has to be called and the query-response process executed as earlier described. The implementation of the UA as well as the overall scheme is feasible with currently available technology.

The authentication service can be provided by telephone switches (such as AT&T's 5ESS ® switch) as a feature. Corporate PBXs can be served by such a switch which will act as a gatekeeper. Once a caller's request to access a PBX is authenticated the caller will be granted access to the PBX by the gatekeeper switch and the PBX will service the caller's requests, so the PBX is not tied up performing repeated authentication for users requesting access. Also, once the system end of the authentication mechanism is available on the telephone network it will become easier to make the UA available for a variety of purposes. The telephone network owner (local telephone company or long distance provider) can then provide authentication as an end to end service—providing both UAs and the authentication service on the network. The UA is not a competitor of the smart card in this respect. While smart cards are usually more computationally powerful and versatile than the proposed UA, they are also more expensive and are restricted by their need for special stations to operate from. The UA is limited in its scope (can be used for authentication only), but can be used from any regular voice phone, and is likely to be less expensive because its hardware is dedicated rather than general-purpose. It may make sense to introduce UAs instead of plastic calling cards at this point. There is a definite need for such a device. At some later point when smart card reader stations are more plentiful the UAs can be upgraded to smart cards.

ALTERNATIVE IMPLEMENTATIONS

It is possible to have a somewhat more rugged and less expensive implementation by not using the standard tones used by DTMF, and instead encoding the audio signals using frequency shift keying with just two frequencies in the audio range (a "high" frequency and a "low" frequency). This is the scheme described, for example, in U.S. Patent 4,823,956, used for incoming caller line identification. In that case the DTMF Tone detector/generator (SSI20C90) will not be needed. Also, instead of a carbon microphone it is possible to use other techniques to pick up the incoming audio. A detector based on an inductor coil (similar to those used in hearing aids) can pick up the electrical signal directly from the phone line (near the earpiece) bypassing the need for a microphone. This will work well in noisy environments. Similarly, instead of an ordinary metal diaphragm speaker, a piezo-electric sound generator can be used to generate the outgoing audio. Such piezo-electric devices are physically more rugged than metal diaphragms and are also more compact. They are also less expensive. Them is no need for high fidelity in the audio output because it is only necessary for the far end to determine whether the frequency is "high" or "low". So piezo-electric sound generators which are typically limited to a few frequencies may be quite acceptable.

The authenticator device requires the user to execute two actions with the device in order to receive authentication. The user has to first click the receive/transmit key and hold the device against the earpiece to receive the incoming audio signal, and then click the key again and hold the device against the mouthpiece to transmit the outgoing audio signal. A modification to the scheme can reduce the number of user actions needed and make the device easier to use.

By adding a pseudo random signal generator (such as a Pseudo Noise sequence generator) and an internal clock, the device can be itself made to produce the input number. Then there is no need to receive incoming audio signals from the phone line. The user then, has to only hold the device against the mouthpiece and click the transmit key. The Time of Day available from the internal clock will be provided as the seed to the pseudo random signal generator, and the output of this generator will be the input number to the authenticator device. The device will transmit both its internal Time of Day (year, month, day, hour and minute) along with the output number from the computation/table look-up function.

The system at the far end receives the Time of Day from the device and first verifies that it is close (within a threshold) to its own internal Time of Day. If the device's Time of Day is not within the threshold, the far end system (PBX or switch) will ask that the device's clock be synchronized with the far end system's clock before authentication is requested. The check for the consistency of Time of Day is to be done to prevent an eavesdropper from recording a pair—Time of Day and output number—and reusing the pair to gain fraudulent authentication.

If the device's Time of Day is within the acceptable threshold the far end system uses the transmitted Time of Day to generate the input number for authentication, and subsequently the output number, and matches it against the output number received. In case of a match, authentication will be granted.

Another alternative, somewhat less safe, is to store a count in the UA, and advance the count with each use. The authentication system also keeps track of the count. The UA transmits both the count and the transformation of the count to the authentication system. The authentication system will then verify the transformation but will only accept the authentication if the transmitted count exceeds the last authenticated count. Advantageously, this arrangement prevents someone who has intercepted a legitimate authentication from simply reusing it, but avoids the necessity for receiving a random number from the authentication system.

The term "random" or "pseudo-random" as used herein means that the number is unpredictable, and not that it meets the tests of random numbers such as those found in a random number table. Unpredictability is the key attribute.

The audio communication interface that has been described here can also be used in Smart Cards such as the AT&T SMART CARD ®. No special reader station is needed for this mode of communication and so the Smart Cards equipped with an audio interface can be used over ordinary phone lines. Transmission of information can be executed by holding the card against the mouthpiece and clicking the receive/transmit key. Likewise, information from the far end can be received by holding the card against the earpiece and clicking the receive/transmit key. To guard against errors in transmission, the audio signals may be encoded using error detection/correction codes.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. Authentication means comprising:
   means for automatically transmitting audio signals over a voice telephone line, said line connected via a telephone network to an authentication system, said means for transmitting arranged for transmitting by having a user of said authentication means hold said means for transmitting against a microphone of a telephone station while leaving a speaker of said telephone station available for said user of said authentication means to listen;
   means for generating a number, independent of any keyed personal identification number, coupled to said means for transmitting, wherein said number is derived from a time-varying quantity and a key unique for said authentication means, and said quantity globally and independently maintained internally in said authentication means and in said authentication system; said number for transmission by said means for transmitting to said authentication system for authenticating an identity of said user of said authentication means; and said number comprising data for identifying said authentication means and comprising no data based on any keyed personal identification data;
   means for storing a personal identification number;
   a keypad for entry of a personal identification number; and
   means for enabling said authentication means in response to a match of the stored and entered personal identification numbers.

2. Authentication means comprising:
   means for automatically transmitting audio signals over a voice telephone line, said line connected via a telephone network to an authentication system, said means for transmitting arranged for transmitting by having a user of said authentication means hold said means for transmitting against a microphone of a telephone station while leaving a speaker of said telephone station available for said user of said authentication means to listen;
   means for generating a number, independent of any keyed personal identification number, coupled to said means for transmitting, wherein said number is derived from a time-varying quantity and a key unique for said authentication means, and said quantity independently maintained internally in said authentication means and in said authentication system; said number for transmission by said means for transmitting to said authentication system for authenticating an identity of said user of said authentication means; and said number comprising data for identifying said authentication means and comprising no data based on any keyed personal identification data;

means for storing a personal identification number;

a keypad for entry of a personal identification number; and means for enabling said authentication means in response to a match of the stored and entered personal identification numbers.

3. The authentication means of claims 1 or 2 further comprising a control key, for operation by said user in response to prompting signals received on said speaker of said telephone station, for changing a state of said authentication means.

4. The authentication means of claim 3 wherein said control key is used for initiating transmission of said number.

5. The authentication means of claims 1 or 2 further comprising a key for disabling said authentication means.

6. The authentication means of claims 1 or 2 further comprising timing means for disabling said authentication device after a lapse of a predetermined interval following enablement or use of said authentication means.

7. The authentication means of claim 1 or 2 further comprising clock means for maintaining date and time;

wherein said independently maintained quantity is date and time.

8. The authentication means of claims 1 or 2 wherein said authentication means is essentially the size of a credit card and is without appendages.

9. The authentication means of claims 1 or 2 further comprising:

means for displaying said number;

wherein, in noisy surroundings, said user is enabled to key said number into said telephone station, using a keypad of said station.

10. The authentication means of claims 1 or 2 further comprising:

means for storing additional personal identification numbers; and means for storing additional data corresponding to said additional personal identification numbers;

wherein said means for enabling is also responsive to a match of one of said additional personal identification numbers for enabling said authentication means; and wherein said means for generating is further responsive to said additional data if said user keys one of said additional personal identification numbers.

* * * * *